(12) United States Patent
Takahashi et al.

(10) Patent No.: US 11,053,333 B2
(45) Date of Patent: Jul. 6, 2021

(54) METHOD FOR PRODUCING METHACRYLATE COPOLYMER SOLUTION

(71) Applicant: KURARAY CO., LTD., Kurashiki (JP)

(72) Inventors: Toru Takahashi, Tsukuba (JP);
Fumihiko Okabe, Tainai (JP);
Atsuhiro Nakahara, Tainai (JP)

(73) Assignee: KURARAY CO., LTD., Okayama (JP)

( * ) Notice: Subject to any disclaimer, the term of this patent is extended or adjusted under 35 U.S.C. 154(b) by 79 days.

(21) Appl. No.: 16/464,540

(22) PCT Filed: Nov. 29, 2017

(86) PCT No.: PCT/JP2017/042845
§ 371 (c)(1),
(2) Date: May 28, 2019

(87) PCT Pub. No.: WO2018/101342
PCT Pub. Date: Jun. 7, 2018

(65) Prior Publication Data
US 2020/0317838 A1    Oct. 8, 2020

(30) Foreign Application Priority Data
Nov. 30, 2016 (JP) ................................. 2016-232823

(51) Int. Cl.
| | | |
|---|---|---|
| *C10M 107/28* | (2006.01) | |
| *C10M 145/14* | (2006.01) | |
| *C08L 33/12* | (2006.01) | |
| *C08F 220/14* | (2006.01) | |
| *C08F 220/18* | (2006.01) | |
| *C08F 2/06* | (2006.01) | |
| *C08F 6/10* | (2006.01) | |
| *C08K 5/01* | (2006.01) | |
| *C08L 91/00* | (2006.01) | |
| *C10M 101/02* | (2006.01) | |

(52) U.S. Cl.
CPC .............. *C08F 220/14* (2013.01); *C08F 2/06* (2013.01); *C08F 6/10* (2013.01); *C08F 220/1811* (2020.02); *C08F 220/1812* (2020.02); *C08F 220/1818* (2020.02); *C08K 5/01* (2013.01); *C08L 91/00* (2013.01); *C10M 145/14* (2013.01); *C08L 33/12* (2013.01); *C10M 101/02* (2013.01); *C10M 107/28* (2013.01)

(58) Field of Classification Search
CPC .......... C08F 220/1811; C08F 220/1812; C08F 220/1818; C08F 220/14; C08L 33/10; C08L 33/12; C10M 101/02; C10M 107/28; C10M 145/14
See application file for complete search history.

(56) References Cited

U.S. PATENT DOCUMENTS

| | | | | |
|---|---|---|---|---|
| 3,226,326 A * | 12/1965 | Beardmore | ......... | C08L 2666/02 |
| | | | | 508/440 |
| 4,937,302 A | 6/1990 | Schoedel | | |
| 5,264,527 A | 11/1993 | Varshney et al. | | |
| 5,294,674 A | 3/1994 | Varshney et al. | | |
| 5,591,816 A | 1/1997 | Varshney et al. | | |
| 5,668,231 A | 9/1997 | Varshney et al. | | |
| 6,228,819 B1 | 5/2001 | Schauber | | |
| 6,255,261 B1 * | 7/2001 | Liesen | ................. | C10M 145/14 |
| | | | | 508/469 |
| 6,329,480 B1 | 12/2001 | Uchiumi et al. | | |
| 6,391,996 B1 | 5/2002 | Scherer et al. | | |
| 8,143,202 B2 * | 3/2012 | Peer | ...................... | C08F 220/18 |
| | | | | 508/469 |
| 10,351,792 B2 * | 7/2019 | Kwak | ................. | C10M 145/14 |
| 2002/0032290 A1 | 3/2002 | Uchiumi et al. | | |
| 2007/0117725 A1 * | 5/2007 | Hsu | ...................... | C10M 145/14 |
| | | | | 508/471 |
| 2009/0048406 A1 * | 2/2009 | Iroff | ........................ | C08F 20/18 |
| | | | | 526/60 |
| 2014/0135243 A1 * | 5/2014 | Takagi | ............... | C10M 159/005 |
| | | | | 508/506 |

(Continued)

FOREIGN PATENT DOCUMENTS

| | | | | |
|---|---|---|---|---|
| EP | 569 639 A1 * | 11/1993 | ............ | C08F 220/18 |
| JP | 1-226837 A | 9/1989 | | |

(Continued)

OTHER PUBLICATIONS

International Search Report dated Feb. 13, 2018 in PCT/JP/2017/042845 filed Nov. 29, 2017.

*Primary Examiner* — Rip A Lee

(74) *Attorney, Agent, or Firm* — Greenblum & Bernstein, P.L.C.

(57) ABSTRACT

A method for producing a polymer solution including a methacrylate copolymer having a weight average molecular weight of not less than 100,000, a weight average molecular weight/number average molecular weight of 1.01 to 1.8 and a glass transition temperature of not more than 40° C. and including methyl methacrylate units and alkyl (meth)acrylate units containing a C10-36 alkyl group, and a first solvent having a boiling point of not less than 200° C., through steps including a step (I) of preparing the methacrylate copolymer by polymerizing monomers in a second solvent having a boiling point of below 200° C., and a step (II) of mixing the solution from the step (I) which includes the methacrylate copolymer and the second solvent, with the first solvent, and removing the second solvent to raise the content of the first solvent to not less than 10 mass % of the polymer solution.

7 Claims, No Drawings

(56) References Cited

U.S. PATENT DOCUMENTS

| | | | | |
|---|---|---|---|---|
| 2016/0097017 A1* | 4/2016 | Eisenberg | ........... | C08F 290/048 |
| | | | | 508/503 |
| 2016/0348026 A1* | 12/2016 | Souchik | .................. | C08L 33/06 |
| 2018/0127575 A1* | 5/2018 | Chichak | .................... | C08F 2/38 |
| 2018/0148529 A1* | 5/2018 | Thomaides | ........... | C10L 1/1963 |
| 2018/0245014 A1* | 8/2018 | Nakada | ................. | C08F 220/18 |
| 2018/0327687 A1* | 11/2018 | Kwak | .................. | C10M 145/20 |
| 2019/0330553 A1* | 10/2019 | Vadillo | ............... | C08F 297/026 |

FOREIGN PATENT DOCUMENTS

| | | |
|---|---|---|
| JP | 7-25859 B2 | 11/1993 |
| JP | 6-93060 A | 4/1994 |
| JP | 7-304803 A | 11/1995 |
| JP | 11-335432 A | 12/1999 |
| JP | 2002-534448 A | 10/2002 |
| JP | 2007-84658 A | 4/2007 |
| JP | 2011-157555 A | 8/2011 |
| JP | 5286128 B2 | 9/2013 |
| JP | 2014-136772 A | 7/2014 |

\* cited by examiner

METHOD FOR PRODUCING METHACRYLATE COPOLYMER SOLUTION

TECHNICAL FIELD

The present invention relates to a method for producing a methacrylate copolymer solution. More particularly, the present invention relates to a method for producing a solution in a high-boiling solvent of a methacrylate copolymer having a small ratio Mw/Mn of weight average molecular weight Mw to number average molecular weight Mn and containing an alkyl (meth)acrylate as a structural unit.

BACKGROUND ART

It usually takes large amounts of time and enormous heating and stirring energies to dissolve a solid polymer uniformly into a viscous liquid such as a lubricant base oil to form a viscous polymer solution. A known approach to this hassle is to polymerize a starting monomer by solution radical polymerization using the viscous liquid as a solvent, thereby producing directly a viscous solution of the polymer (see Patent Literature 1 and others).

Molecular weight distribution (Mw/Mn) that is expressed as the ratio of weight average molecular weight to number average molecular weight of a polymer indicates a distribution of high-molecular components and low-molecular components from the average molecular weight. A polymer is often used for different applications depending on whether it is narrow dispersed or wide dispersed.

A narrow disperse (meth)acrylate polymer is usually produced by living polymerization such as living anionic polymerization or living radical polymerization in a solvent. Unfortunately, not many solvents can be used without causing a decrease in the activity of polymerization initiators.

CITATION LIST

Patent Literature

Patent Literature 1: JP-A-H07-304803
Patent Literature 2: Japanese Patent No. 5286128
Patent Literature 3: JP-A-2014-136772

SUMMARY OF INVENTION

Technical Problem

An object of the present invention is to provide a method for efficiently producing a solution of a narrow disperse methacrylate copolymer in a high-boiling solvent.

Solution to Problem

The present inventors carried out studies directed to achieving the above object, and have completed the present invention as a result. Some aspects of the present invention are described below.

[1] A method for producing a polymer solution, the polymer solution including:
(A) a methacrylate copolymer having a weight average molecular weight of not less than 100,000, a weight average molecular weight/number average molecular weight of 1.01 to 1.8 and a glass transition temperature of not more than 40° C. and including methyl methacrylate units and alkyl (meth) acrylate units containing a C10-36 alkyl group; and
(B) a solvent having a boiling point of not less than 200° C.;
the method including:
(I) a step of preparing the methacrylate copolymer (A) by polymerizing monomers in a solvent (C) with a boiling point of below 200° C.; and
(II) a step of mixing the solution from the step (I) which includes the methacrylate copolymer (A) and the solvent (C), with the solvent (B), and removing the solvent (C) to raise the content of the solvent (B) to not less than 10 mass % of the polymer solution.

[2] The method for producing a polymer solution described in [1], wherein the solvent (C) is an aromatic hydrocarbon.

[3] The method for producing a polymer solution described in [1] or [2], wherein the solvent (B) is a mineral oil.

[4] The method for producing a polymer solution described in any one of [1] to [3], wherein the methacrylate copolymer (A) includes 5 to 90 mass % of methyl methacrylate units and 95 to 10 mass % of alkyl (meth)acrylate units containing a C10-36 linear alkyl group.

[5] The method for producing a polymer solution described in any one of [1] to [4], wherein the polymer solution obtained has a viscosity at 200° C. of not more than 40,000 cps.

[6] A method for producing a lubricant composition, including using a polymer solution obtained by the production method described in any one of [1] to [5].

Advantageous Effects of Invention

The production method according to the present invention can efficiently produce in a simple manner a methacrylate copolymer solution which includes a high-boiling solvent that cannot be used as a polymerization solvent. According to the production method of the invention, the methacrylate copolymer solution can be obtained with a high solid concentration for later handling such as transportation, storage or dilution in downstream steps.

DESCRIPTION OF EMBODIMENTS

A methacrylate copolymer (A) in the production method of the present invention has a weight average molecular weight of not less than 100,000, a weight average molecular weight/number average molecular weight of 1.01 to 1.8 and a glass transition temperature of not more than 40° C. and includes methyl methacrylate units and alkyl (meth)acrylate units containing a C10-36 alkyl group.

Examples of the alkyl (meth)acrylates containing a C10-36 alkyl group which will form structural units constituting the methacrylate copolymer (A) together with the methyl methacrylate units include alkyl (meth)acrylates containing a linear alkyl group such as n-decyl (meth)acrylate, n-undecyl (meth)acrylate, n-dodecyl (meth)acrylate (or lauryl (meth)acrylate), n-tridecyl (meth)acrylate, n-tetradecyl (meth)acrylate, n-pentadecyl (meth)acrylate, n-hexadecyl (meth)acrylate, n-heptadecyl (meth)acrylate, n-octadecyl (meth)acrylate (or stearyl (meth)acrylate), n-nonadecyl (meth)acrylate, n-eicosyl (meth)acrylate, n-heneicosyl (meth)acrylate, n-docosyl (meth)acrylate, n-tricosyl (meth) acrylate, n-tetracosyl (meth)acrylate, n-pentacosyl (meth) acrylate, n-hexacosyl (meth)acrylate, n-heptacosyl (meth) acrylate, n-octacosyl (meth)acrylate, n-nonacosyl (meth) acrylate, n-triacontyl (meth)acrylate, n-hentriacontyl (meth) acrylate, n-dotriacontyl (meth)acrylate, n-tritriacontyl (meth)acrylate, n-tetratriacontyl (meth)acrylate, n-pentatriacontyl (meth)acrylate and n-hexatriacontyl (meth)acrylate; and alkyl (meth)acrylates containing a branched alkyl group such as isodecyl (meth)acrylate, 2,4,6-trimethylheptyl (meth)acrylate, 2-butyloctyl (meth)acrylate, 2-ethyl-n-dodecyl (meth)acrylate, 2-methyl-n-tetradecyl (meth)acrylate, isohexadecyl (meth)acrylate, 2-n-octyl-n-nonyl (meth)acrylate, isooctadecyl (meth)acrylate, 1-n-hexyl-n-tridecyl (meth)acrylate, 2-ethyl-n-heptadecyl (meth)acrylate, isoicosyl (meth)acrylate (or 2-n-octyl-n-dodecyl (meth)acrylate), 1-n-octyl-n-pentadecyl (meth)acrylate, 2-n-decyl-n-tetradecyl (meth)acrylate, 2-n-dodecyl-n-pentadecyl (meth)acrylate, isotriacontyl (meth)acrylate, 2-n-tetradecyl-n-heptadecyl (meth)acrylate, 2-n-hexadecyl-n-heptadecyl (meth)acrylate, 2-n-hexadecyl-n-icosyl (meth)acrylate and 2-n-tetradecyl-n-docosyl (meth)acrylate.

Of the alkyl (meth)acrylate units containing a C10-36 alkyl group, those alkyl (meth)acrylate units containing a C14-30 alkyl group are preferable from the points of view of the viscosity index improving effects when the copolymer is used as a viscosity index improver and the shear viscosity stability when the copolymer is formed into a lubricant composition. From the similar points of view, those alkyl (meth)acrylate units containing a C16-28 alkyl group are more preferable, and those alkyl (meth)acrylate units containing a C16-24 alkyl group are particularly preferable. The methacrylate copolymer (A) may contain only a single kind of alkyl (meth)acrylate units containing a C10-36 alkyl group, or may contain two or more kinds of such alkyl (meth)acrylate units. The total content of the methyl methacrylate units and the alkyl (meth)acrylate units containing a C10-36 alkyl group is preferably not less than 50 mass % of the methacrylate copolymer (A).

The methacrylate copolymer (A) may contain units derived from (meth)acrylate ester monomers other than the alkyl (meth)acrylates described above. Examples of such additional (meth)acrylate ester monomers include (meth)acrylate esters having an alicyclic alkyl group such as cyclopentyl (meth)acrylate, cyclohexyl (meth)acrylate, isobornyl (meth)acrylate and tricyclododecyl (meth)acrylate; (meth)acrylate esters having an aromatic hydrocarbon group such as phenyl (meth)acrylate, benzyl (meth)acrylate, naphthyl (meth)acrylate and biphenyl (meth)acrylate; (meth)acrylate esters having an ether group such as methoxymethyl (meth)acrylate, 2-methoxyethyl (meth)acrylate, 2-methoxypropyl (meth)acrylate, 2-ethoxyethyl (meth)acrylate, 2-ethoxypropyl (meth)acrylate, methoxypolyethylene glycol (meth)acrylate and methoxypolypropylene glycol (meth)acrylate; N,N-dialkyl(meth)acrylamides such as N,N-dimethyl(meth)acrylamide, N,N-diethyl(meth)acrylamide, N,N-diisopropyl(meth)acrylamide and N,N-di-n-butyl(meth)acrylamide; (meth)acrylate esters having an epoxy group such as glycidyl (meth)acrylate; polyfunctional (meth)acrylate esters such as 1,3-propanediol di(meth)acrylate, 1,3-butanediol di(meth)acrylate, 1,4-butanediol di(meth)acrylate, 1,6-hexanediol di(meth)acrylate, 1,9-nonanediol di(meth)acrylate, 1,10-decanediol di(meth)acrylate, neopentyl glycol di(meth)acrylate, polyalkylene glycol di(meth)acrylate, bisphenol A di(meth)acrylate, tricyclodecanedimethanol di(meth)acrylate, trimethylolpropane tri(meth)acrylate, glycerin tri(meth)acrylate and pentaerythritol tetra(meth)acrylate; alkyl (meth)acrylates having a linear or branched C2-9 alkyl group; and methyl acrylate.

The methacrylate copolymer (A) is not particularly limited as long as it includes methyl methacrylate units and alkyl (meth)acrylate units containing a C10-36 alkyl group. From the point of view of the viscosity index improving effects when the copolymer is used as a viscosity index improver, it is preferable that the copolymer include 5 to 90 mass % of methyl methacrylate units and 95 to 10 mass % of alkyl (meth)acrylate units containing a C10-36 linear alkyl group. The content of methyl methacrylate units in the methacrylate copolymer (A) is preferably 10 to 80 mass %, and more preferably 15 to 45 mass %. In the methacrylate copolymer (A), it is preferable that the content of alkyl (meth)acrylate units containing a C10-36 linear alkyl group be 5 to 60 mass %, and the content of alkyl (meth)acrylate units containing a C10-36 branched alkyl group be 5 to 60 mass %. Further, in the methacrylate copolymer (A), it is more preferable that the content of alkyl (meth)acrylate units containing a C12-20 linear alkyl group be 10 to 60 mass %, and the content of alkyl (meth)acrylate units containing a C16-28 branched alkyl group be 10 to 60 mass %.

The weight average molecular weight Mw of the methacrylate copolymer (A) is not less than 100,000, and is preferably 100,000 to 500,000, more preferably 120,000 to 400,000, and still more preferably 150,000 to 370,000.

In the methacrylate copolymer (A), the ratio of Mw to number average molecular weight (hereinafter, "Mn") (Mw/Mn, hereinafter, "molecular weight distribution") is 1.01 to 1.8, preferably 1.01 to 1.6, more preferably 1.02 to 1.6, still more preferably 1.05 to 1.6, and particularly preferably 1.05 to 1.5. By virtue of the molecular weight distribution being in this range, the methacrylate copolymer (A) exhibits superior viscosity index improving effects when used as a viscosity index improver and offers excellent shear viscosity stability of a lubricant composition including the copolymer. The Mw and Mn depend on, for example, the amounts of hydroxyl-containing compounds and polymerization inhibitor present in the raw materials including alkyl (meth)acrylate monomers used in the production of the methacrylate copolymer (A). The Mw and Mn are polystyrene-equivalent molecular weights measured by GPC analysis.

The glass transition temperature of the methacrylate copolymer (A) is not more than 40° C. From the point of view of the efficiency in the removal of solvent (C), the glass transition temperature is preferably not less than −80° C. and not more than 35° C., more preferably not less than −70° C. and not more than 30° C., and still more preferably not less than −50° C. and not more than 25° C.

The polymer solution production method of the present invention includes a step (I) in which the methacrylate copolymer (A) is prepared by polymerizing monomers in a solvent (C) with a boiling point of below 200° C. The monomers include methyl methacrylate and an alkyl (meth)acrylate containing a C10-36 alkyl group.

The methacrylate copolymer (A) may be prepared by any process without limitation as long as the polymerization of the monomers takes place in the solvent (C) having a boiling point of below 200° C. Some preferred processes are controlled radical polymerization such as atom transfer radical polymerization (ATRP), reversible addition-fragmentation chain-transfer polymerization (RAFT), nitroxide-mediated polymerization (NMP), iodine transfer polymerization, polymerization using hetero elements deep in the periodic table (such as organic tellurium, antimony and bismuth), boron-mediated polymerization, catalytic chain transfer (CCT) polymerization and polymerization using metals such as cobalt and titanium and carbon bonds as dormant species (OMRP), and anionic polymerization (typically, highly living anionic polymerization). In particular, anionic polymerization is more preferable because the methacrylate copolymer (A) that is obtained is of high thermal stability. Examples of such anionic polymerization processes include anionic polymerization using an organoalkali metal compound as a polymerization initiator in the presence of a mineral acid salt such as an alkali metal or alkaline earth metal salt (see JP-B-H07-25859), anionic polymerization using an organoalkali metal compound as a polymerization initiator in the presence of an organoaluminum compound (see JP-A-H11-335432), and anionic polymerization using an organic rare earth metal complex or a metallocene metal complex as a polymerization initiator (see JP-A-H06-93060). In particular, for the reasons that the polymer that is obtained has a smaller Mw/Mn, offers good shear viscosity stability when used as a viscosity index improver, and has high syndiotacticity to exhibit high viscosity index improving effects when used as a viscosity index improver, it is preferable to adopt anionic polymerization using an organoalkali metal compound as a polymerization initiator in the presence of an organoaluminum compound.

The methacrylate copolymer (A) is preferably produced by anionic polymerization using an organoalkali metal compound as a polymerization initiator in the presence of an organoaluminum compound. For example, this preferred process is performed by polymerizing (meth)acrylate esters in the presence of an organolithium compound and an organoaluminum compound represented by the following general formula (1):

$$AlR^1R^2R^3 \qquad (1)$$

wherein $R^1$, $R^2$ and $R^3$ are each independently an optionally substituted alkyl group, an optionally substituted cycloalkyl group, an optionally substituted aryl group, an optionally substituted aralkyl group, an optionally substituted alkoxyl group, an optionally substituted aryloxy group or an N,N-disubstituted amino group, or wherein $R^1$ represents any of the above groups and $R^2$ and $R^3$ together represent an optionally substituted arylenedioxy group. Where necessary, the polymerization further involves an ether such as dimethyl ether, dimethoxyethane, diethoxyethane or 12-crown-4; and/or a nitrogen-containing compound such as triethylamine, N,N,N',N'-tetramethylethylenediamine, N,N,N',N",N"-pentamethyldiethylenetriamine, 1,1,4,7,10,10-hexamethyltriethylenetetramine, pyridine or 2,2'-dipyridyl, in the reaction system.

For example, the organolithium compound used in the anionic polymerization process may be one, or two or more of alkyllithiums and alkyldilithiums such as methyllithium, ethyllithium, n-propyllithium, isopropyllithium, n-butyl lithium, sec-butyllithium, isobutyllithium, tert-butyllithium, n-pentyllithium, n-hexyllithium, tetramethylenedilithium, pentamethylenedilithium and hexamethylenedilithium; aryllithiums and aryldilithiums such as phenyllithium, m-tolyllithium, p-tolyllithium, xylyllithium and lithium naphthalene; aralkyllithiums and aralkyldilithiums such as benzyllithium, diphenylmethyllithium, tritylithium, 1,1-diphenyl-3-methylpentyllithium, α-methylstyryllithium and dilithium formed by the reaction of diisopropenylbenzene and butyllithium; lithium amides such as lithium dimethylamide, lithium diethylamide and lithium diisopropylamide; and lithium alkoxides such as methoxylithium, ethoxylithium, n-propoxylithium, isopropoxylithium, n-butoxylithium, sec-butoxylithium, tert-butoxylithium, pentyloxylithium, hexyloxylithium, heptyloxylithium, octyloxylithium, phenoxylithium, 4-methylphenoxylithium, benzyloxylithium and 4-methylbenzyloxylithium.

For example, the organoaluminum compound of the general formula (1) may be one, or two or more of trialkylaluminums such as trimethylaluminum, triethylaluminum, triisobutylaluminum and tri-n-octylaluminum; dialkylphenoxyaluminums such as dimethyl(2,6-di-tert-butyl-4-methylphenoxy)aluminum, dimethyl(2,6-di-tert-butylphenoxy)aluminum, diethyl(2,6-di-tert-butyl-4-methylphenoxy)aluminum, diethyl(2,6-di-tert-butylphenoxy) aluminum, diisobutyl(2,6-di-tert-butyl-4-methylphenoxy) aluminum and diisobutyl(2,6-di-tert-butylphenoxy) aluminum; alkyldiphenoxyaluminums such as methylbis(2,6-di-tert-butyl-4-methylphenoxy)aluminum, methylbis(2,6-di-tert-butylphenoxy)aluminum, ethyl[2,2'-methylenebis(4-methyl-6-tert-butylphenoxy)]aluminum, ethylbis(2,6-di-tert-butyl-4-methylphenoxy)aluminum, ethylbis(2,6-di-tert-butylphenoxy)aluminum, ethyl[2,2'-methylenebis(4-methyl-6-tert-butylphenoxy)]aluminum, isobutylbis(2,6-di-tert-butyl-4-methylphenoxy)aluminum, isobutylbis(2,6-di-tert-butylphenoxy)aluminum and isobutyl[2,2'-methylenebis(4-methyl-6-tert-butylphenoxy)] aluminum; alkoxydiphenoxyaluminums such as methoxybis(2,6-di-tert-butyl-4-methylphenoxy)aluminum, methoxybis(2,6-di-tert-butylphenoxy)aluminum, methoxy[2,2'-methylenebis (4-methyl-6-tert-butylphenoxy)]aluminum, ethoxybis(2,6-di-tert-butyl-4-methylphenoxy)aluminum, ethoxybis(2,6-di-tert-butylphenoxy)aluminum, ethoxy[2,2'-methylenebis(4-methyl-6-tert-butylphenoxy)]aluminum, isopropoxybis(2,6-di-tert-butyl-4-methylphenoxy)aluminum, isopropoxybis(2,6-di-tert-butylphenoxy)aluminum and isopropoxy[2,2'-methylenebis(4-methyl-6-tert-butylphenoxy)]aluminum; and triphenoxyaluminums such as tris(2,6-di-tert-butyl-4-methylphenoxy)aluminum and tris(2,6-diphenylphenoxy) aluminum. In particular, among others, isobutylbis(2,6-di-tert-butyl-4-methylphenoxy)aluminum, isobutylbis(2,6-di-tert-butylphenoxy)aluminum and isobutyl[2,2'-methylenebis(4-methyl-6-tert-butylphenoxy)]aluminum are particularly preferable for use because they are handleable easily and can allow the polymerization of (meth)acrylate esters to proceed under relatively mild temperature conditions without being deactivated.

The methacrylate copolymer (A) may be a random copolymer, a block copolymer, a graft copolymer or a star-shaped copolymer, and is preferably a random copolymer.

The solvent (C) used in the preparation of the methacrylate copolymer (A) in the step (I) has a boiling point of below 200° C. By virtue of the boiling point of this solvent being below 200° C., the methacrylate copolymer (A) may be prepared with less depression of the activity of a polymerization initiator. To further lessen the depression of the polymerization initiator activity, the boiling point of the solvent (C) is preferably below 150° C., and more preferably below 120° C. To facilitate the preparation of the methacrylate copolymer, the boiling point of the solvent (C) is preferably not less than 30° C., and more preferably not less than 100° C.

The solvent (C) having a boiling point of below 200° C. is not particularly limited as long as the reaction is not adversely affected. Examples thereof include aliphatic hydrocarbons such as pentane, n-hexane and octane; alicyclic hydrocarbons such as cyclopentane, methylcyclopentane, cyclohexane, methylcyclohexane and ethylcyclohexane; aromatic hydrocarbons such as benzene, toluene, ethylbenzene and xylene; and ethers such as diethyl ether, tetrahydrofuran, 1,4-dioxane and anisole. In particular, aromatic hydrocarbons are preferable for reasons such as that these solvents have high solvent properties for the resultant copolymer, are unlikely to mix into the waste liquid, and are easily recovered and purified. Toluene and xylene are more preferable. The solvents may be used singly, or two or more may be used in combination. To let the polymerization reaction proceed smoothly, it is preferable that the solvent be purified by deaeration and dehydration beforehand. The solvent (C) may be used in an amount of 60 to 2000 parts by mass relative to 100 parts by mass of the methacrylate copolymer (A) that will be obtained.

For example, the methacrylate copolymer (A) may be obtained by terminating the polymerization reaction by the addition of a polymerization terminator to the polymerization solution. Examples of the polymerization terminators include protic compounds such as water, methanol, acetic acid and hydrochloric acid. The amount of the polymerization terminator is not particularly limited but is usually in the range of 1 to 100 times the molar amount of the polymerization initiator used.

If aluminum originating from the organoaluminum compound used remains in the solution of the methacrylate copolymer (A) after the termination of the polymerization, properties of the methacrylate copolymer (A) or a material which includes the copolymer may be deteriorated. It is therefore preferable to remove aluminum originating from the organoaluminum compound after the completion of the polymerization. Such aluminum may be effectively removed by washing, after the addition of the polymerization terminator, the polymerization solution with an acidic aqueous solution, or by subjecting the polymerization solution to treatment such as adsorption treatment using an adsorbent such as an ion exchange resin, or by precipitating and separating the residual aluminum.

The polymer solution production method of the present invention includes a step (II) in which the solution from the step (I) which includes the methacrylate copolymer (A) and the solvent (C) is mixed with a solvent (B) having a boiling point of not less than 200° C., and thereafter the solvent (C) is removed to raise the content of the solvent (B) to not less than 10 mass % of the polymer solution. As a result of the removal of the solvent (C), the content of the solvent (B) in the polymer solution may be raised from the initial level of below 10 mass % to an increased level of 10 mass % or above.

The solvent (B) has a boiling point of not less than 200° C. When, for example, the polymer solution obtained according to the present invention is used as a lubricant composition, the boiling point of the solvent (B) is preferably not less than 210° C., and more preferably not less than 230° C. For example, the boiling point of the solvent (B) is not more than 360° C.

The solvent (B) with a boiling point of not less than 200° C. is not particularly limited as long as the liquid can dissolve the methacrylate copolymer (A). A mineral oil or a synthetic oil is preferable, and a mineral oil is more preferable. Examples of the mineral oils include commercial lubricant base oils such as YUBASE 4 (manufactured by SK OIL LUBRICANTS JAPAN CO., LTD., boiling point: 222° C.) and COSMO NEUTRAL 100 (manufactured by COSMO OIL LUBRICANTS Co., Ltd., boiling point: at least 284° C.). Examples of the synthetic oils include commercial lubricant base oils such as LINEALENE 12 (manufactured by Idemitsu Kosan Co., Ltd., boiling point: 208-216° C.)

In the step (II), the solution which includes the methacrylate copolymer (A) and the solvent (C) is mixed with the solvent (B) to form a mixture solution. Because the solution containing the methacrylate copolymer (A) and the solvent (C) is usually of low viscosity, this step may be performed by, for example, adding the solvent (B) to the solution containing the methacrylate copolymer (A) and the solvent (C) and mixing the resultant mixture by a conventional stirring technique. Alternatively, the solution containing the methacrylate copolymer (A) and the solvent (C) may be added to the solvent (B). Before the mixing process, the solution containing the methacrylate copolymer (A) and the solvent (C) may be concentrated by a known technique to reduce the content of the solvent (C) beforehand. The content of the solvent (C) before the start of the removal of the solvent (C) is preferably not less than 5 mass %, and more preferably not less than 10 mass %, and may be not less than 20 mass %, not less than 30 mass % or not less than 40 mass %, and may be not more than 80 mass %. The amount in which the solvent (B) is used may be 10 to 10000 parts by mass relative to 100 parts by mass of the methacrylate copolymer (A). The amount of the solvent (B) added before the start of the removal of the solvent (C) may be controlled appropriately so that, for example, the polymer solution after the removal of the solvent (C) will have a viscosity which allows the solution to be collected from the apparatus (for example, a viscosity which will be of collectable level at an operational temperature of the polymer solution collecting apparatus).

In the step (II), the solvent (C) is removed from the solution including the methacrylate copolymer (A), the solvent (B) and the solvent (C). The apparatus used to remove the solvent (C) may be, for example, a single-screw or twin-screw vent extruder, a falling film evaporator, a boiling tube evaporator, a flash evaporator, wiped film evaporator or a stripping column.

When, for example, a wiped film evaporator is used, the temperature inside the evaporator is usually about ambient to about 300° C., preferably 110 to 280° C., and more preferably 160 to 260° C. from the points of view of the fluidity of the solution containing the methacrylate copolymer (A), the solvent (B) and the solvent (C) and the thermal stability of the methacrylate copolymer (A).

When the solvent (C) is removed with a wiped film evaporator, the apparatus is preferably evacuated. During this process, the degree of vacuum needs to be controlled appropriately in accordance with the boiling point of the solvent used. When, for example, the solvent (C) is toluene, which has a boiling point of 110° C., the degree of vacuum may be about $2.6 \times 10^3$ Pa, and toluene may be condensed and recovered sufficiently with use of cooling water having a temperature of about 10° C.

The film evaporator in the present invention is not particularly limited but is preferably one which is equipped with a wiper for highly viscous fluid and has a strong shaft and motor capable of withstanding high shaft power.

When the concentration of the methacrylate copolymer (A) is about 40 mass % or less and the amount of the organic solvents is relatively large, a wiped film evaporator is particularly effective for the removal of the solvent (C).

In the present invention, the solution including the methacrylate copolymer (A) and the solvent (B) which results from the removal of the solvent (C) may be collected by ejection or the like and may be recovered into a container such as a drum can or a pail can.

The polymer solution obtained by the production method of the invention contains 10 mass % or more solvent (B). From the point of view of the handling of the polymer solution, the content is preferably not less than 30 mass % and not more than 99 mass %, and more preferably not less than 50 mass % and not more than 75 mass %.

In the present invention, the polymer solution including the methacrylate copolymer (A) and the solvent (B) which results from the removal of the solvent (C) preferably has such a level of fluidity that the solution droops or falls by self-weight into a recovery container at a temperature at which it is collected from the apparatus.

From the point of view of the handling of the polymer solution obtained by the production method of the invention, the content of the methacrylate copolymer (A) in the polymer solution is preferably not less than 1 mass % and not more than 90 mass %, and more preferably not less than 25 mass % and not more than 50 mass %.

When, for example, the polymer solution is used as a lubricant composition, the content of the solvent (C) in the polymer solution obtained by the production method of the invention is preferably not more than 3 parts by mass, and more preferably not less than 0.01 part by mass and not more than 2.5 parts by mass relative to 100 parts by mass of the methacrylate copolymer (A).

The polymer solution including the methacrylate copolymer (A) and the solvent (B) that is obtained by the production method of the invention preferably has a viscosity at 200° C. of not more than 40,000 cps, and more preferably not more than 10,000 cps.

The polymer solution production method of the present invention may further include a step of adding an additive. Examples of the additives include antioxidants, thermal deterioration inhibitors, light stabilizers, UV absorbers, lubricating agents, release agents, polymeric processing aids, antistatic agents, flame retardants, dyes and pigments, light diffusing agents, organic colorants, matting agents, impact modifiers, fluorescent materials, antiwear agents (or extreme pressure agents), corrosion inhibitors, rust inhibitors, pour point depressants, demulsifiers, metal deactivators, antifoaming agents and ashless friction modifiers.

The polymer solution obtained by the present invention may be suitably used as a lubricant composition. In this case, the methacrylate copolymer (A) serves as a viscosity index improver, and the solvent (B) as a base oil. For example, the polymer solution obtained by the present invention may be formed into a lubricant composition by being admixed with a mineral oil or a synthetic oil which is similar or dissimilar to the solvent (B) in desired proportions.

When the polymer solution is used as a lubricant composition, the additives described hereinabove and any other additives may be added to the lubricant composition. Examples of such additional additives include cleaning agents, dispersants and oiliness improvers.

The methacrylate copolymer (A) contained in the polymer solution of the invention has a narrow molecular weight distribution and excellent mechanical characteristics such as shear viscosity stability. Thus, the polymer solution of the invention may be used in various applications including not only lubricant compositions containing viscosity index improvers, but also polyolefin modifiers, pressure-sensitive adhesives, adhesives, primers, surface-functionalizing coating agents such as hard coats, and tire modifiers.

EXAMPLES

Hereinbelow, the present invention will be described in detail based on Examples and Comparative Examples. However, it should be construed that the scope of the invention is not limited to such examples.

(Weight Average Molecular Weight Mw, Weight Average Molecular Weight Mw/Number Average Molecular Weight Mn, Content of High-Molecular Components, and Content of Low-Molecular Components)

Gel permeation chromatography (GPC) measurement was performed under the conditions described below. The chromatogram obtained was analyzed to calculate the molecular weights relative to standard polystyrenes. The baseline was drawn in the GPC chart by connecting the point at which the slope of the peak on the higher molecular weight side changed from zero to positive with the passage of retention time, to the point at which the slope of the peak on the lower molecular weight side changed from negative to zero with the passage of retention time.

GPC apparatus: HLC-8320 manufactured by TOSOH CORPORATION

Detector: differential refractometer detector

Columns: Two TSKgel SuperMultipore HZM-M columns and SuperHZ4000 manufactured by TOSOH CORPORATION were connected in series.

Eluent: tetrahydrofuran

Eluent flow rate: 0.35 ml/min

Column temperature: 40° C.

Calibration curve: prepared using data of ten standard polystyrenes (Composition of Monomers in Polymer)

With use of a nuclear magnetic resonance apparatus (ULTRA SHIELD 400 PLUS manufactured by Bruker), a $^1$H-NMR spectrum was measured with respect to 10 mg of a methacrylate copolymer (A) dissolved in 1 mL of deuterated chloroform under conditions of room temperature and 64 scans. In the spectrum, the areas were determined of the signals at 3.3 to 4.2 ppm, with reference to TMS taken as 0 ppm, arising from the methylene or methine, and methyl groups adjacent to the oxygen atom in the ester group. The composition of structural units derived from monomers in the methacrylate copolymer (A) was thus calculated.

(Glass Transition Temperature of Copolymer)

In accordance with JIS K7121 and with use of a differential scanning calorimeter (DSC-50 (product number) manufactured by SHIMADZU CORPORATION), a sample was heated to 230° C., cooled to room temperature, and thereafter heated from room temperature to 230° C. at 10° C./min while recording a DSC curve. The intermediate glass transition temperature in the DSC curve measured during the second heating process was obtained as the glass transition temperature in the present invention.

(Amount of Toluene Contained in Devolatilized Solution)

InertCap 1 column (df=0.4 μm, 0.25 mm I.D.×60 m) manufactured by GL Sciences Inc. was connected to gas chromatograph GC-2014 manufactured by SHIMADZU CORPORATION. Measurement was performed under conditions where the injection temperature was 240° C., the detector temperature was 300° C., the column temperature was increased from 180° C. to 280° C. at a heat-up rate of 10° C./min, and the retention time was 10 minutes. The amount of toluene contained in the recovered solution after the above devolatilization process was determined by an absolute calibration method and was expressed in parts by mass relative to 100 parts by mass of a methacrylate copolymer (A).

(Viscosity Before and after Devolatilization)

Measurements were performed at predetermined temperatures with a Brookfield viscometer (BIT Viscometer manufactured by TOKI SANGYO CO., LTD.).

(Solvent (B))

In Examples and Comparative Examples, a commercial mineral oil (YUBASE 4 manufactured by SK OIL LUBRICANTS JAPAN CO., LTD., boiling point: 222° C.) was used as a solvent (B) with a boiling point of not less than 200° C.

Production Example 1

A methacrylate copolymer (A) was produced as described below with reference to JP-A-2007-84658. A three-way cock was attached to a thoroughly dried 2 L three-necked flask, and the inside was purged with nitrogen. At room temperature, there were added 480 g of toluene, 24 g of 1,2-dimethoxyethane, and 10 g of a 0.45 M toluene solution of isobutylbis(2,6-di-t-butyl-4-methylphenoxy)aluminum. Further, 0.27 g of a 1.0 mmol solution of sec-butyllithium in a mixed solvent of cyclohexane and n-hexane was added. Subsequently, 85 g of an alkyl methacrylate monomer mixture was added which contained 30 mass % of 2-n-octyl-n-dodecyl methacrylate (hereinafter, simply "2-octyldodecyl methacrylate"), 30 mass % of stearyl methacrylate and 40 mass % of methyl methacrylate. The resultant mixture was stirred at room temperature for 12 hours. The reaction liquid was yellow at first, but became colorless after the 12 hours of stirring. Thereafter, the polymerization was terminated by the addition of 25.7 g of a 30% aqueous acetic acid solution at room temperature. The solution was heat treated at 95° C. for 2 hours, and a metal salt was precipitated. The solution was allowed to stand overnight, and the supernatant was recovered. A 15 mass % toluene solution of a methacrylate copolymer was thus obtained.

$^1$H-NMR measurement and GPC measurement showed that the methacrylate copolymer obtained was a random copolymer having a weight average molecular weight (Mw) of 250,000, a number average molecular weight (Mn) of 185,200 and a molecular weight distribution (Mw/Mn) of 1.35.

The mass ratio of the structural units derived from the respective monomers in the methacrylate copolymer was 40 mass % for the structural units derived from methyl methacrylate, 30 mass % for the structural units derived from stearyl methacrylate, and 30 mass % for the structural units derived from 2-octyldodecyl methacrylate. The glass transition temperature was 25° C. These results are also described in the section (Methacrylate copolymer) in Table 1 for Example 1 which involved the solution of Production Example 1.

Production Example 2

A toluene solution of a methacrylate copolymer was obtained in the same manner as in Example 1, except that 0.27 g of the 1.0 mmol solution of sec-butyllithium in a mixed solvent of cyclohexane and n-hexane was replaced by 0.20 g of a 0.61 mmol solution of sec-butyllithium in a mixed solvent of cyclohexane and n-hexane. The methacrylate copolymer obtained had a glass transition temperature of 25° C. The rest of the evaluation results are described in the section Methacrylate copolymer) in Table 1 for Example 5 which involved the solution of Production Example 2.

Production Example 3

The procedures of Production Example 2 were repeated, except that the alkyl methacrylate monomer mixture was replaced by one which contained 30 mass % stearyl methacrylate, 40 mass % lauryl methacrylate and 30 mass % methyl methacrylate. The glass transition temperature was 20° C. The results of the evaluations of the methacrylate copolymer obtained are described in the section (Methacrylate copolymer) in Table 2 for Example 22 which involved the solution of Production Example 3.

Production Example 4

The procedures of Production Example 1 were repeated, except that the alkyl methacrylate monomer mixture was replaced by one which contained 25 mass % 2-octyldodecyl methacrylate, 25 mass % stearyl methacrylate and 50 mass % methyl methacrylate. The glass transition temperature was 45° C. The results of the evaluations of the methacrylate copolymer obtained are described in the section (Methacrylate copolymer) in Table 3 for Comparative Example 3 which involved the solution of Production Example 4.

Comparative Production Example 5

The reaction was performed in the same manner as in Production Example 1, except that 480 g of toluene was replaced by the same amount of a mineral oil (YUBASE 4 manufactured by SK OIL LUBRICANTS JAPAN CO., LTD., boiling point: 222° C.) The reaction did not give a methacrylate copolymer.

Example 1

400 Parts by mass of the toluene solution of the methacrylate copolymer obtained in Production Example 1 was diluted by the addition of 240 parts by mass of the mineral oil described hereinabove. According to the measurement with the Brookfield viscometer, the viscosity of the diluted solution of the methacrylate copolymer at 100° C. was below 100 cps. The diluted solution of the methacrylate copolymer was treated in the rotary evaporator described in Table 1, and toluene was removed therefrom under the conditions described in Table 1. The solution of the methacrylate copolymer after the devolatilization treatment contained 80 mass % mineral oil, contained toluene in an amount of 0.3 parts by mass relative to 100 parts by mass of the methacrylate copolymer, and had a viscosity at 200° C. of 20 cps.

Example 2

The toluene solution of the methacrylate copolymer obtained in Production Example 1 was concentrated to 51 mass % methacrylate copolymer concentration. Thereafter, the solution was diluted with the mineral oil to control the compositional ratio before toluene removal as described in Table 1. According to the measurement with the Brookfield viscometer, the viscosity of the diluted solution at 100° C. was below 100 cps. The diluted solution of the methacrylate copolymer was treated in film evaporator "WIPRENE 2-03 (manufactured by KOBELCO ECO-SOLUTIONS Co., Ltd.)" described in Table 1, and toluene was removed therefrom under the conditions described in Table 1. The solution of the methacrylate copolymer after the devolatilization treatment contained 75 mass % mineral oil, contained toluene in an amount of 0.6 parts by mass relative to 100 parts by mass of the methacrylate copolymer, and had a viscosity at 200° C. of 20 cps.

Examples 3, 4 and 8 to 10

The toluene solution of the methacrylate copolymer obtained in Production Example 1 was concentrated to a methacrylate copolymer concentration described in Table 1. Thereafter, the solution was diluted with the mineral oil to control the compositional ratio before toluene removal as described in Table 1. According to the measurement with the Brookfield viscometer, the viscosity of the diluted solution at 100° C. was below 100 cps. The diluted solution of the methacrylate copolymer was treated in film evaporator "WIPRENE 2-03 (manufactured by KOBELCO ECO-SO- LUTIONS Co., Ltd.)" or film evaporator "WIPRENE 6-01 (manufactured by KOBELCO ECO-SOLUTIONS Co., Ltd.)" as described in Table 1, and toluene was removed therefrom under the conditions described in Table 1. The amounts of the mineral oil and toluene contained in the solution of the methacrylate copolymer after the devolatilization treatment, and the viscosity of the solution at 200° C. are described in Table 1.

Examples 11 to 16

The toluene solution of the methacrylate copolymer obtained in Production Example 1 was concentrated to a methacrylate copolymer concentration described in Table 2. Thereafter, the solution was diluted with the mineral oil to control the compositional ratio before toluene removal as described in Table 2. According to the measurement with the Brookfield viscometer, the viscosity of the diluted solution at 100° C. was below 100 cps. Toluene was removed from the diluted solution of the methacrylate copolymer under the conditions described in Table 2. The results are described in Table 2.

Examples 5 to 7

The toluene solution of the methacrylate copolymer obtained in Production Example 2 was concentrated to a methacrylate copolymer concentration described in Table 1. Thereafter, the solution was diluted with the mineral oil to control the compositional ratio before toluene removal as described in Table 1. According to the measurement with the Brookfield viscometer, the viscosity of the diluted solution at 100° C. was below 100 cps. Toluene was removed from the diluted solution of the methacrylate copolymer under the conditions described in Table 1. The results are described in Table 1.

Examples 17 to 22

The toluene solution of the methacrylate copolymer obtained in Production Example 2 or 3 was subjected to compositional ratio control and devolatilization treatment under the conditions described in Table 2. The results are described in Table 2.

Comparative Example 1

The toluene solution of the methacrylate copolymer obtained in Production Example 1 was concentrated to a methacrylate copolymer concentration described in Table 3, and thereby the compositional ratio before toluene removal was controlled as described in Table Table 3 without addition of mineral oil. The solution was then subjected to devolatilization under the conditions described in Table 3. The devolatilization treatment afforded no recovery of the polymer solution due to the clogging of the apparatus with the methacrylate copolymer and the consequent failure of the solution to be discharged.

Comparative Example 2

The toluene solution of the methacrylate copolymer obtained in Production Example 1 was concentrated to a methacrylate copolymer concentration described in Table 3. Thereafter, the solution was diluted with the mineral oil to control the compositional ratio before toluene removal as described in Table 3. According to the measurement with the Brookfield viscometer, the viscosity of the diluted solution at 100° C. was below 100 cps. Toluene was removed from the diluted solution of the methacrylate copolymer under the conditions described in Table 3. The results are described in Table 3. Due to the amount of the mineral oil added being so small, the devolatilization treatment was accompanied by clogging of the apparatus with the methacrylate copolymer and the consequent failure of the polymer solution to be discharged and recovered. If the recovery had been made successfully, a devolatilized polymer solution containing about 94 mass % methacrylate copolymer and about 6 mass % mineral oil would have been obtained.

Comparative Example 3

The toluene solution of the methacrylate copolymer obtained in Production Example 4 was concentrated to a methacrylate copolymer concentration described in Table 3. Thereafter, the solution was diluted with the mineral oil to control the compositional ratio before toluene removal as described in Table 3. According to the measurement with the Brookfield viscometer, the viscosity of the diluted solution at 100° C. was below 100 cps. Toluene was removed from the diluted solution of the methacrylate copolymer in the same manner as in Example 8 under the conditions described in Table 3. Due to the glass transition temperature of the methacrylate copolymer being so high, the methacrylate copolymer was precipitated inside the apparatus during the devolatilization treatment and caused a clogging of the apparatus, which resulted in the failure of the polymer solution to be discharged and recovered.

TABLE 1

| | | | Ex. 1 | Ex. 2 | Ex. 3 | Ex. 4 |
|---|---|---|---|---|---|---|
| Methacrylate copolymer | Production Example | | Production Example 1 | | | |
| | Methyl methacrylate | mass % | 40 | 40 | 40 | 40 |
| | Stearyl methacrylate | mass % | 30 | 30 | 30 | 30 |
| | 2-Octyldodecyl methacrylate | mass % | 30 | 30 | 30 | 30 |
| | Mw | | 250000 | 250000 | 250000 | 250000 |
| | Mn | | 185200 | 185200 | 185200 | 185200 |
| | Mw/Mn | | 1.35 | 1.35 | 1.35 | 1.35 |
| Before addition of mineral oil | Methacrylate copolymer concentration | mass % | 15 | 51 | 51 | 51 |
| Before toluene removal | Methacrylate copolymer component | mass % | 9.4 | 20.2 | 20.2 | 20.2 |
| | Toluene component | mass % | 53.1 | 19.4 | 19.4 | 19.4 |
| | Mineral oil component | mass % | 37.5 | 60.5 | 60.5 | 60.5 |
| | Viscosity (100° C.) | cps | <100 | <100 | <100 | <100 |

TABLE 1-continued

| | | | | | | |
|---|---|---|---|---|---|---|
| Apparatus | Type | | Labo evaporator | WIPRENE 2-03 | WIPRENE 2-03 | WIPRENE 2-03 |
| | Heat transfer area | m² | 0.5 L recovery flask | 0.03 | 0.03 | 0.03 |
| | Material | | Pyrex glass | Pyrex glass | Pyrex glass | Pyrex glass |
| Devolatilization conditions | Heating medium preset temperature | ° C. | 80 | 200 | 200 | 200 |
| | Vacuum degree | Torr | 1 | 15 | 15 | 15 |
| | Feed rate | g/min kg/h | | 2.5 | 5.0 | 10.0 |
| After toluene removal | Mineral oil content | mass % | 80 | 75 | 75 | 75 |
| | Toluene content | Parts by mass relative to 100 parts by mass of copolymer | 0.3 | 0.6 | 0.7 | 2.5 |
| | Viscosity (200° C.) | cps | 20 | 20 | 20 | 20 |

| | | | Ex. 5 | Ex. 6 | Ex. 7 |
|---|---|---|---|---|---|
| Methacrylate copolymer | Production Example | | Production Example 2 | | |
| | Methyl methacrylate | mass % | 40 | 40 | 40 |
| | Stearyl methacrylate | mass % | 30 | 30 | 30 |
| | 2-Octyldodecyl methacrylate | mass % | 30 | 30 | 30 |
| | Mw | | 350000 | 350000 | 350000 |
| | Mn | | 250000 | 250000 | 250000 |
| | Mw/Mn | | 1.40 | 1.40 | 1.40 |
| Before addition of mineral oil | Methacrylate copolymer concentration | mass % | 46 | 60 | 60 |
| Before toluene removal | Methacrylate copolymer component | mass % | 22.2 | 25 | 31.6 |
| | Toluene component | mass % | 26.0 | 16.7 | 21.1 |
| | Mineral oil component | mass % | 51.8 | 58.3 | 47.4 |
| | Viscosity (100° C.) | cps | <100 | <100 | <100 |
| Apparatus | Type | | WIPRENE 2-03 | WIPRENE 2-03 | WIPRENE 2-03 |
| | Heat transfer area | m² | 0.03 | 0.03 | 0.03 |
| | Material | | Pyrex glass | Pyrex glass | Pyrex glass |
| Devolatilization conditions | Heating medium preset temperature | ° C. | 200 | 200 | 200 |
| | Vacuum degree | Torr | 15 | 15 | 15 |
| | Feed rate | g/min kg/h | 2.5 | 2.5 | 2.5 |
| After toluene removal | Mineral oil content | mass % | 70 | 70 | 60 |
| | Toluene content | Parts by mass relative to 100 parts by mass of copolymer | 2.2 | 1.9 | 2.2 |
| | Viscosity (200° C.) | cps | 1500 | 1500 | 30000 |

| | | | Ex. 8 | Ex. 9 | Ex. 10 |
|---|---|---|---|---|---|
| Methacrylate copolymer | Production Example | | Production Example 1 | | |
| | Methyl methacrylate | mass % | 40 | 40 | 40 |
| | Stearyl methacrylate | mass % | 30 | 30 | 30 |
| | 2-Octyldodecyl methacrylate | mass % | 30 | 30 | 30 |
| | Mw | | 250000 | 250000 | 250000 |
| | Mn | | 185200 | 185200 | 185200 |
| | Mw/Mn | | 1.35 | 1.35 | 1.35 |
| Before addition of mineral oil | Methacrylate copolymer concentration | mass % | 52 | 52 | 52 |
| Before toluene removal | Methacrylate copolymer component | mass % | 34.2 | 34.2 | 34.2 |
| | Toluene component | mass % | 31.6 | 31.6 | 31.6 |
| | Mineral oil component | mass % | 34.2 | 34.2 | 34.2 |
| | Viscosity (100° C.) | cps | <100 | <100 | <100 |
| Apparatus | Type | | WIPRENE 6-01 | WIPRENE 6-01 | WIPRENE 6-01 |
| | Heat transfer area | m² | 0.11 | 0.11 | 0.11 |
| | Material | | SUS316 | SUS316 | SUS316 |

TABLE 1-continued

| | | | | | |
|---|---|---|---|---|---|
| Devolatilization conditions | Heating medium preset temperature | °C. | 200 | 200 | 200 |
| | Vacuum degree | Torr | 13 | 13 | 15 |
| | Feed rate | g/min | | | |
| | | kg/h | 5.5 | 10.2 | 14.1 |
| After toluene removal | Mineral oil content | mass % | 50 | 50 | 50 |
| | Toluene content | Parts by mass relative to 100 parts by mass of copolymer | 0.1 | 0.2 | 0.5 |
| | Viscosity (200° C.) | cps | 500 | 500 | 500 |

TABLE 2

| | | | Ex. 11 | Ex. 12 | Ex. 13 | Ex. 14 | Ex. 15 | Ex. 16 |
|---|---|---|---|---|---|---|---|---|
| Methacrylate copolymer | Production Example | | Production Example 1 | | | | | |
| | Methyl methacrylate | mass % | 40 | 40 | 40 | 40 | 40 | 40 |
| | Stearyl methacrylate | mass % | 30 | 30 | 30 | 30 | 30 | 30 |
| | 2-Octyldodecyl methacrylate | mass % | 30 | 30 | 30 | 30 | 30 | 30 |
| | Lauryl methacrylate | mass % | | | | | | |
| | Mw | | 250000 | 250000 | 250000 | 250000 | 250000 | 250000 |
| | Mn | | 185200 | 185200 | 185200 | 185200 | 185200 | 185200 |
| | Mw/Mn | | 1.35 | 1.35 | 1.35 | 1.35 | 1.35 | 1.35 |
| Before addition of mineral oil | Methacrylate copolymer concentration | mass % | 52 | 52 | 52 | 52 | 52 | 52 |
| Before toluene removal | Methacrylate copolymer component | mass % | 34.2 | 34.2 | 22.2 | 22.2 | 22.2 | 22.2 |
| | Toluene component | mass % | 31.6 | 31.6 | 20.5 | 20.5 | 20.5 | 20.5 |
| | Mineral oil component | mass % | 34.2 | 34.2 | 57.2 | 57.2 | 57.2 | 57.2 |
| | Viscosity (100° C.) | cps | <100 | <100 | <100 | <100 | <100 | <100 |
| Apparatus | Type | | WIPRENE 6-01 | WIPRENE 6-01 | WIPRENE 6-01 | WIPRENE 6-01 | WIPRENE 6-01 | WIPRENE 6-01 |
| | Heat transfer area | m$^2$ | 0.11 | 0.11 | 0.11 | 0.11 | 0.11 | 0.11 |
| | Material | | SUS316 | SUS316 | SUS316 | SUS316 | SUS316 | SUS316 |
| Devolatilization conditions | Heating medium preset temperature | °C. | 200 | 200 | 200 | 200 | 200 | 200 |
| | Vacuum degree | Torr | 15 | 14 | 15 | 15 | 15 | 15 |
| | Feed rate | g/min | | | | | | |
| | | kg/h | 38.6 | 24.3 | 35.5 | 25 | 13.4 | 8.9 |
| After toluene removal | Mineral oil content | mass % | 50 | 50 | 72 | 72 | 72 | 72 |
| | Toluene content | Parts by mass relative to 100 parts by mass of copolymer | 1.8 | 1.1 | 0.8 | 0.8 | 0.3 | 1.0 |
| | Viscosity (200° C.) | cps | 500 | 500 | 30 | 30 | 30 | 30 |

| | | | Ex. 17 | Ex. 18 | Ex. 19 | Ex. 20 | Ex. 21 | Ex. 22 |
|---|---|---|---|---|---|---|---|---|
| Methacrylate copolymer | Production Example | | Production Example 2 | | | | | Production Example 3 |
| | Methyl methacrylate | mass % | 40 | 40 | 40 | 40 | 40 | 30 |
| | Stearyl methacrylate | mass % | 30 | 30 | 30 | 30 | 30 | 30 |
| | 2-Octyldodecyl methacrylate | mass % | 30 | 30 | 30 | 30 | 30 | |
| | Lauryl methacrylate | mass % | | | | | | 40 |
| | Mw | | 350000 | 350000 | 350000 | 350000 | 350000 | 300000 |
| | Mn | | 250000 | 250000 | 250000 | 250000 | 250000 | 240000 |
| | Mw/Mn | | 1.40 | 1.40 | 1.40 | 1.40 | 1.40 | 1.25 |
| Before addition of mineral oil | Methacrylate copolymer concentration | mass % | 46 | 46 | 46 | 46 | 46 | 46 |
| Before toluene removal | Methacrylate copolymer component | mass % | 22.2 | 22.2 | 22.2 | 22.2 | 22.2 | 22.2 |
| | Toluene component | mass % | 26.0 | 26.0 | 26.0 | 26.0 | 26.0 | 26.0 |
| | Mineral oil component | mass % | 51.8 | 51.8 | 51.8 | 51.8 | 51.8 | 51.8 |
| | Viscosity (100° C.) | cps | <100 | <100 | <100 | <100 | <100 | <100 |

TABLE 2-continued

| Apparatus | Type | | WIPRENE 6-01 | WIPRENE 6-01 | WIPRENE 6-01 | WIPRENE 6-01 | WIPRENE 6-01 | WIPRENE 6-01 |
|---|---|---|---|---|---|---|---|---|
| | Heat transfer area | m² | 0.11 | 0.11 | 0.11 | 0.11 | 0.11 | 0.11 |
| | Material | | SUS316 | SUS316 | SUS316 | SUS316 | SUS316 | SUS316 |
| Devolatilization conditions | Heating medium preset temperature | °C. | 200 | 200 | 200 | 180 | 180 | 180 |
| | Vacuum degree | Torr | 15 | 15 | 15 | 15 | 15 | 15 |
| | Feed rate | g/min kg/h | 36.7 | 25.5 | 13.9 | 14.1 | 37.1 | 37.1 |
| After toluene removal | Mineral oil content | mass % | 70 | 70 | 70 | 70 | 70 | 70 |
| | Toluene content | Parts by mass relative to 100 parts by mass of copolymer | 1.0 | 0.9 | 1.1 | 1.9 | 2.2 | 0.4 |
| | Viscosity (200° C.) | cps | 1500 | 1500 | 1500 | 1500 | 1500 | 10 |

TABLE 3

| | | | Comp. Ex. 1 | Comp. Ex. 2 | Comp. Ex. 3 |
|---|---|---|---|---|---|
| Methacrylate copolymer | Production Example | | Production Example 1 | Production Example 1 | Production Example 4 |
| | Methyl methacrylate | mass % | 40 | 40 | 50 |
| | Stearyl methacrylate | mass % | 30 | 30 | 25 |
| | 2-Octyldodecyl methacrylate | mass % | 30 | 30 | 25 |
| | Mw | | 250000 | 250000 | 250000 |
| | Mn | | 185200 | 185200 | 185200 |
| | Mw/Mn | | 1.35 | 1.35 | 1.35 |
| Before addition of mineral oil | Methacrylate copolymer concentration | mass % | 52 | 52 | 52 |
| Before toluene removal | Methacrylate copolymer component | mass % | 52 | 50 | 34.2 |
| | Toluene component | mass % | 48 | 47 | 31.6 |
| | Mineral oil component | mass % | 0 | 3 | 34.2 |
| | Viscosity (100° C.) | cps | <100 | <100 | <100 |
| Apparatus | Type | | WIPRENE 6-01 | WIPRENE 6-01 | WIPRENE 6-01 |
| | Heat transfer area | m² | 0.11 | 0.11 | 0.11 |
| | Material | | SUS316 | SUS316 | SUS316 |
| Devolatilization conditions | Heating medium preset temperature | °C. | 200 | 200 | 200 |
| | Vacuum degree | Torr | 15 | 15 | 13 |
| | Feed rate | g/min kg/h | 5.5 | 5.5 | 5.5 |
| After toluene removal | Mineral oil content | mass % | — | — | — |
| | Toluene content | Parts by mass relative to 100 parts by mass of copolymer | — | — | — |
| | Viscosity (200° C.) | cps | Solution could not be recovered. | — | Copolymer precipitated and solution could not be recovered. |

The invention claimed is:

1. A method for producing a polymer solution comprising a methacrylate copolymer and a first solvent, the method comprising:
    preparing the methacrylate copolymer by polymerizing monomers in a second solvent, thereby producing a solution comprising the methacrylate copolymer and the second solvent; and
    mixing the solution with the first solvent, and removing the second solvent to raise a content of the first solvent to not less than 10 mass % of the polymer solution,
    wherein the methacrylate copolymer has a weight average molecular weight of not less than 100,000, a weight average molecular weight/number average molecular weight of 1.01 to 1.8 and a glass transition temperature of not more than 40° C. and comprises methyl methacrylate units and alkyl (meth)acrylate units containing a C10-36 alkyl group;
    the first solvent has a boiling point of not less than 200° C.; and
    the second solvent has a boiling point of below 200° C.

2. The method according to claim 1, wherein the second solvent is an aromatic hydrocarbon.

3. The method according to claim 1, wherein the first solvent is a mineral oil.

4. The method according to claim 1, wherein the methacrylate copolymer comprises 5 to 90 mass % of methyl methacrylate units and 95 to 10 mass % of alkyl (meth)acrylate units containing a C10-36 linear alkyl group.

5. The method according to claim 1, wherein the polymer solution has a viscosity at 200° C. of not more than 40,000 cps.

6. A method for producing a lubricant composition, comprising:
adding an additive to a polymer solution obtained by the method of claim 1 to form a lubricant composition.

7. The method for producing a lubricant composition according to claim 6, wherein the additive is selected from a cleaning agent, dispersant, oiliness improver, antioxidant, thermal deterioration inhibitor, light stabilizer, UV absorber, lubricating agent, release agent, polymeric processing aid, antistatic agent, flame retardant, dye, pigment, light diffusing agent, organic colorant, matting agent, impact modifier, fluorescent material, antiwear agent, corrosion inhibitor, rust inhibitor, pour point depressant, demulsifier, metal deactivator, antifoaming agent, or ashless friction modifier.

* * * * *